(12) United States Patent
Miyano et al.

(10) Patent No.: US 6,186,009 B1
(45) Date of Patent: *Feb. 13, 2001

(54) SEMICONDUCTOR PRESSURE SENSOR FOR SENSING FLUID PRESSURE

(75) Inventors: Junichi Miyano; Akira Sawada; Keiji Sasaki, all of Tokyo (JP)

(73) Assignee: Fujikoki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/110,322

(22) Filed: Jul. 6, 1998

(30) Foreign Application Priority Data

Jul. 10, 1997 (JP) .................................... 9-185140

(51) Int. Cl.$^7$ ........................................................ G01L 7/00
(52) U.S. Cl. ................................................................ 73/756
(58) Field of Search ............................... 73/715, 716, 717, 73/718, 719, 720, 721, 722, 723, 724, 725, 726, 727, 756; 338/4, 42

(56) References Cited

U.S. PATENT DOCUMENTS

| 4,019,388 | 4/1977 | Hall, II et al. ........................... 73/398 |
| 4,675,643 | 6/1987 | Tanner et al. ............................. 338/4 |
| 4,898,035 | * 2/1990 | Yajimi et al. ........................... 73/727 |
| 4,972,716 | * 11/1990 | Tobita et al. ........................... 73/721 |
| 5,014,557 | * 5/1991 | Lawless .................................. 73/756 |
| 5,186,055 | * 2/1993 | Kovacich et al. ...................... 73/727 |
| 5,313,839 | * 5/1994 | Ridenour ................................. 73/756 |
| 5,331,857 | * 7/1994 | Levine et al. ........................... 73/756 |
| 5,343,757 | * 9/1994 | Tate ......................................... 73/724 |
| 5,477,738 | 12/1995 | Tobita et al. ............................ 73/716 |
| 5,515,732 | 5/1996 | Willcox et al. ......................... 73/724 |
| 5,635,649 | * 6/1997 | Tobita et al. ............................ 73/717 |

FOREIGN PATENT DOCUMENTS 59-11230  7/1984 (JP) .

* cited by examiner

Primary Examiner—William Oen
(74) Attorney, Agent, or Firm—Armstrong, Westerman, Hattori, McLeland & Naughton

(57) ABSTRACT

The object of the present invention is to provide a pressure sensor comprising a pressure sensing element of a plurality of resistors on a semiconductor board, wherein said pressure sensing element is fixed inside the housing firmly and airtightly. A pressure sensor 10 comprising a housing 11 made of metal material, and a pressure sensing element mounted on a semiconductor board 13 positioned in the interior of said housing for sensing pressure, wherein said housing 11 comprises a liquid induction hole 11$d$, an inner area connecting to said liquid induction hole and having an opening in an upper portion, and an annular protrusion 11$g$ formed in the peripheral of an opening of said liquid induction hole at a bottom portion of said inner area, characterized in that said pressure sensing element 13 is welded airtightly to said protrusion 11$g$ of said housing 11 through a seat 21 comprising an opening 21$a$ at the center thereof formed of a pressure sensing element mounting member 21-1 and a stem connecting member 20$d$, and a stem 20 having an opening 20$d$ at the center thereof.

11 Claims, 3 Drawing Sheets

SEMICONDUCTOR PRESSURE SENSOR FOR SENSING FLUID PRESSURE

TECHNICAL FIELD OF THE INVENTION

The present invention relates to pressure sensors and, more particularly, to semiconductor pressure sensors preferable for sensing fluid pressure such as refrigerant of refrigerating/cooling devices.

BACKGROUND OF THE INVENTION

In the prior art, these kinds of pressure sensors comprising semiconductor chips were, as is disclosed in Japanese Patent Application Laid-Open No. H3-226638, equipped with a housing and a stem fixed to the lower portion of said housing and having a semiconductor chip storage chamber, wherein a glass seat is connected to the concave portion of said storage room, and a semiconductor chip is connected airtightly to said glass seat said semiconductor chip measuring the pressure of the refrigerant introduced through a pressure induction hole of said stem and a pressure induction hole of said glass seat.

In the above type of pressure sensors, a borosilicate glass is used as the material of the glass seat, and an iron-nickel (Fe—Ni) system alloy is used as the material of the stem, and these materials differ greatly in their temperature characteristics such as the thermal expansion coefficient. When temperature change occurs to a pressure sensor with such glass seat and metal stem connected to each other, the connection may be separated by the difference in the thermal expansion coefficient, which may lead to a problem where pressure could not be added accurately to the pressure sensing element.

In order to prevent such problems, the connection between the outer peripheral of the glass seat and the inner wall of the concave portion of the stem is provided by a low-melting glass having a thermal expansion coefficient which is at the middle of the thermal expansion coefficient of the glass seat and the thermal expansion coefficient of the stem, so that when the pressure sensor is used for a long period of time and repeated temperature changes occur to the connection of the glass seat and the stem, the connection will not separate or exfoliate, and the glass seat could be connected firmly to the upper portion of the stem.

The prior art pressure sensor of the above comprising the pressure sensing element formed of semiconductor chips had a problem in that the connection of the glass seat and the stem was troublesome and time-consuming, since the glass seat and the stem could not be connected by one step, having to place low-melting glass material to the gap between the outer peripheral of the glass seat and the concave of the stem, and then sealing the connection of the stem and the glass seat by melting said low-melting glass material.

Further, since the above-mentioned prior art technique connects the glass seat and the stem by a low-melting glass having a thermal expansion coefficient that is in the middle of the thermal expansion coefficient of each member, there is a need to select a glass material having a certain thermal expansion coefficient, which is inconvenient in that only a limited glass material could be used.

Further, the above technique solves the problem based on the difference in said expansion coefficient by selecting a certain glass material for the connection. However, the glass seat and the stem naturally differ in their thermal expansion coefficient based on the difference in material, so even when a low-melting glass having a thermal expansion coefficient in the middle of the thermal expansion coefficient of the glass seat and that of the stem is used, the connection provided by such technique may not be perfect when the pressure sensor is used for a long time.

In order to overcome the above problems, the present applicant proposed a pressure sensor including a connection of a stem and a seat for fitting a pressure sensing element of a semiconductor chip characterized in that the sensor is constituted so that the assembly and mounting of members could easily be done, and that the connected members do not separate or exfoliate under temperature change in Japanese patent application No. H8-268927.

The structure of the pressure sensor according to the above invention is explained hereinafter with reference to FIG. 3.

FIG. 3 is a vertical cross-sectional view of the pressure sensor 10 according to the above-explained invention. The pressure sensor 10 comprises a housing 11 of a metal material at the outer portion and an electric connector 12 which is fit and connected to said housing 11, and placed in the inner area formed by said housing 11 and said electric connector 12 is a semiconductor chip 13 with a pressure sensing element having a strain gage formed on the upper surface and an electric circuit board (print board) 14 with a calculating circuit and the like for converting an output from said semiconductor chip to an electric output of a voltage or a current.

Said housing 11 is formed of a metal such as iron (Fe) or stainless steel (SUS), and comprises a pipe-like screw 11c having a refrigerant liquid induction hole 11d on its lower portion and a receiving open pipe 11a on its upper portion, and further comprising a funnel-like supporting portion 11b in its middle interior portion, and said funnel-like supporting portion 11b includes a flat bottom 11e on its lower portion.

Said electric connector 12 is formed by an electrical insulating material of artificial resin such as polybutylene terephthalate reinforced by glass, comprising a guide pipe 12b for the fitting and separating of a connector on the upper portion, and an enlarging fitting pipe 12a on the lower portion. In the interior of said electric connector 12, three connector terminals 17 (two of which are not shown) penetrating the inner area of the enlarging fitting pipe 12a from the inner area of the guide pipe 12b are fixed.

Said electric circuit board 14 is placed to fit into an inner ring portion 11f of said receiving open pipe 11a of the housing 11, and an o-ring 15 is positioned on said electric circuit board 14 for waterproofing and supporting of the board 14, which is fit into said ring portion 11f. The fitting pipe 12a of said electric connector 12 fits to the upper end of said receiving open pipe 11a of the housing 11, and in a state where a lower inclining portion 12c of said fitting pipe 12a of the electric connector 12 presses said electric circuit board 14 through said o-ring 15, an opening peripheral portion 11a' at the end of said receiving open pipe 11a of the housing 11 stakes a shoulder portion 12d of said enlarging fitting pipe 12a of the electric connector. By such method, the housing 11 and the electric connector 12 are fit and connected together, and the electric circuit board 14 is fixed and held firmly inside the inner area formed by the housing and the electric connector.

A connecting conductive sleeve 18 is connected and fixed to a lower angled end 17a of said connector terminal 17 by a spot welding and the like, and on said connecting conductive sleeve 18, an upper portion 19b of a pin terminal 19 is inserted, and a lower portion 19a of said pin terminal 19 is fixed onto said electric circuit board 14 by soldering and the like. Said pin terminal 19 transmits electric signals from said electric circuit board to said connector terminal 17.

A stem 20 of an iron-nickel (Fe—Ni) alloy such as 42 alloy is fit and fixed to the funnel-like supporting portion 11b placed in the interior of said housing 11.

Said stem 20 comprises a lower pipe 20a which fits in the liquid induction hole 11d of said housing 11, a protruding collar 20b placed on a flat surface 11e of said funnel-like supporting portion 11b, and an upper mounting portion 20c for placing the seat 21, and further comprising a penetrating hole 20d in the upper and lower direction as a liquid path, wherein at least the surface contacting the seat 21 is gold (Au) plated with a thickness of approximately 1 μm. Said stem 20 is welded firmly onto the plan surface 11e of said housing 11 by potential resistance weld at said protruding collar 20b.

A seat 21 made of silicon is positioned and fixed on said upper mounting portion 20c of the stem 20. Said seat 21 is equipped with a penetrating hole 21a for passing through liquid material which is positioned concentric to the penetrating hole 20d of said stem 20. An insulating layer of $SiO_2$ with a thickness of approximately 1 μm is formed on the upper surface of the seat 21 for electric insulation. Further, the surface of said insulating layer is gold (Au) plated with a thickness of approximately 1 μm. Also, the lower surface of said seat 21 is gold (Au) plated so as to form a metal layer, and the seat is welded and fixed to the upper mounting portion 20c of said stem 20 by gold (Au) blazing.

A semiconductor chip 13 is positioned and fixed on said seat 21 for measuring the pressure of the refrigerant liquid. A diaphragm is formed on said semiconductor 13, and a semiconductor strain gage (both of which is not shown in the drawing) is positioned on said diaphragm. The pressure of the refrigerant introduced through the penetrating hole 20d of said stem and the penetrating hole 21a of said seat 21 is impressed to said diaphragm, and based on the level of pressure of said refrigerant, an electric signal is outputted from said semiconductor strain gage.

On the lower surface of said semiconductor chip 13 is also formed a gold (Au) plated metal layer with a thickness of approximately 1 μm, wherein the semiconductor chip 13 is welded and fixed airtightly to said seat 21 by gold (Au) brazing.

On the upper portion of said electric circuit board 14 is a mount portion 14a of an electric circuit of an amplifying circuit and the like, and said mount portion 14a is electrically connected to the strain gage of said semiconductor chip 13 by a bonding wire 14b, and the electric signal from the strain gage of said semiconductor chip 13 is transmitted to the amplifying circuit of said electric circuit board 14 through said bonding wire 14b for amplification, which is outputted to said connector terminal 17 through said pin terminal 19.

Some other methods for connecting said housing 11 and said Fe—Ni alloy stem 20 are methods such as laser welding or silver or bronze brazing and the like. Further, in the case where the stem 20 is made of ceramic, an example of the method for connecting said housing 11 and said ceramic stem 20 is by mounting a connecting cap made of Fe—Ni alloy between the housing 11 and the ceramic stem 20, and the connection between each of said housing 11, said ceramic stem 20, said connecting cap and said seat 21 may be realized by forming a metal layer to the connecting portion of each said members by gold plating, and welding said metal layer by gold (Au) brazing.

However, even by said proposed methods, it is necessary to confirm the reliable connection between the protruding collar 20b of the stem 20 and the flat bottom 11e of the funnel-like supporting portion 11b of the housing 11, and to form an annular welding portion for completely shutting the area between the opening 11d and the space inside the funnel-like supporting portion 11b. However, it is difficult to form a connecting portion having a closed annular shape to such a wide contact surface by electrical resistance weld, and a problem such as stripping of the connecting portion may occur by using it for a long time.

The present invention considers the above problem, and aims at providing a pressure sensor comprising a pressure sensing element of a semiconductor chip formed by a plurality of resistors on a semiconductor board including a structure for fixing the pressure sensing element in the housing firmly and airtightly, and also at providing a structure for positioning the pressure sensing element and the calculation circuit in the same environment to improve measurement accuracy.

SUMMARY OF THE INVENTION

In order to achieve the above object, the present invention provides a pressure sensor comprising a housing made of metal material, and a pressure sensing element mounted on a semiconductor board positioned in the interior of said housing for sensing pressure, wherein said housing comprises a liquid induction hole, an inner area connecting to said liquid induction hole and having an opening in an upper portion, and an annular protrusion formed in the peripheral of an opening of said liquid induction hole at a bottom portion of said inner area, characterized in that said pressure sensing element is fixed airtightly to said protrusion through a seat comprising a pressure sensing element mounting member and a stem connecting member and having an opening at the center thereof, and a stem having an opening at the center thereof.

Further, the present invention provides the above-identified pressure sensor wherein said pressure sensing element is fixed airtightly to the upper surface of said pressure sensing element mounting member of said seat, said pressure sensing element mounting member and said stem connecting member of said seat are fixed airtightly together, said stem connecting member of the seat is fixed airtightly to the stem, and said stem is fixed airtightly to said protrusion formed on the bottom portion in the inner area of the housing.

Further, the present invention provides the above-identified pressure sensor wherein the fixing of said stem and said protrusion is performed by an electrical resistance weld, and the fixing of said pressure sensing element and said pressure sensing element mounting member, and the fixing of said pressure sensing element mounting member and said stem connecting member is performed by anode connection (FAB connection).

Still further, the present invention provides the above-identified pressure sensor wherein a gold plated layer is formed on at least the portion of the stem opposing said stem connecting member, and a gold plating layer is formed on at least the portion of the stem connecting member opposing the stem, and the welding of the stem with the stem connecting member is performed by a gold and silicon alloy formed by adding heat.

Further, the present invention provides the above-identified pressure sensor wherein said pressure sensing element mounting member of said seat is formed of glass, said stem connecting member is formed of silicon or silicon alloy, and said stem is formed of 42 alloy.

The present invention provides the above-identified pressure sensor wherein said pressure sensing element comprises a thin diaphragm portion formed in the center area of the semiconductor board and a thick portion formed on the peripheral area thereof which is strong against deformation, and on said diaphragm portion in the center area is mounted a pressure sensing portion having a piezoresistor as plurality of resistors, and on said thick portion in the peripheral area is mounted a calculating portion formed by an integrated circuit manufacturing technique.

DETAILED DESCRIPTION

The preferred embodiment of the pressure sensor according to the present invention will hereinafter be explained with reference to FIGS. 1 and 2.

Figure 1:
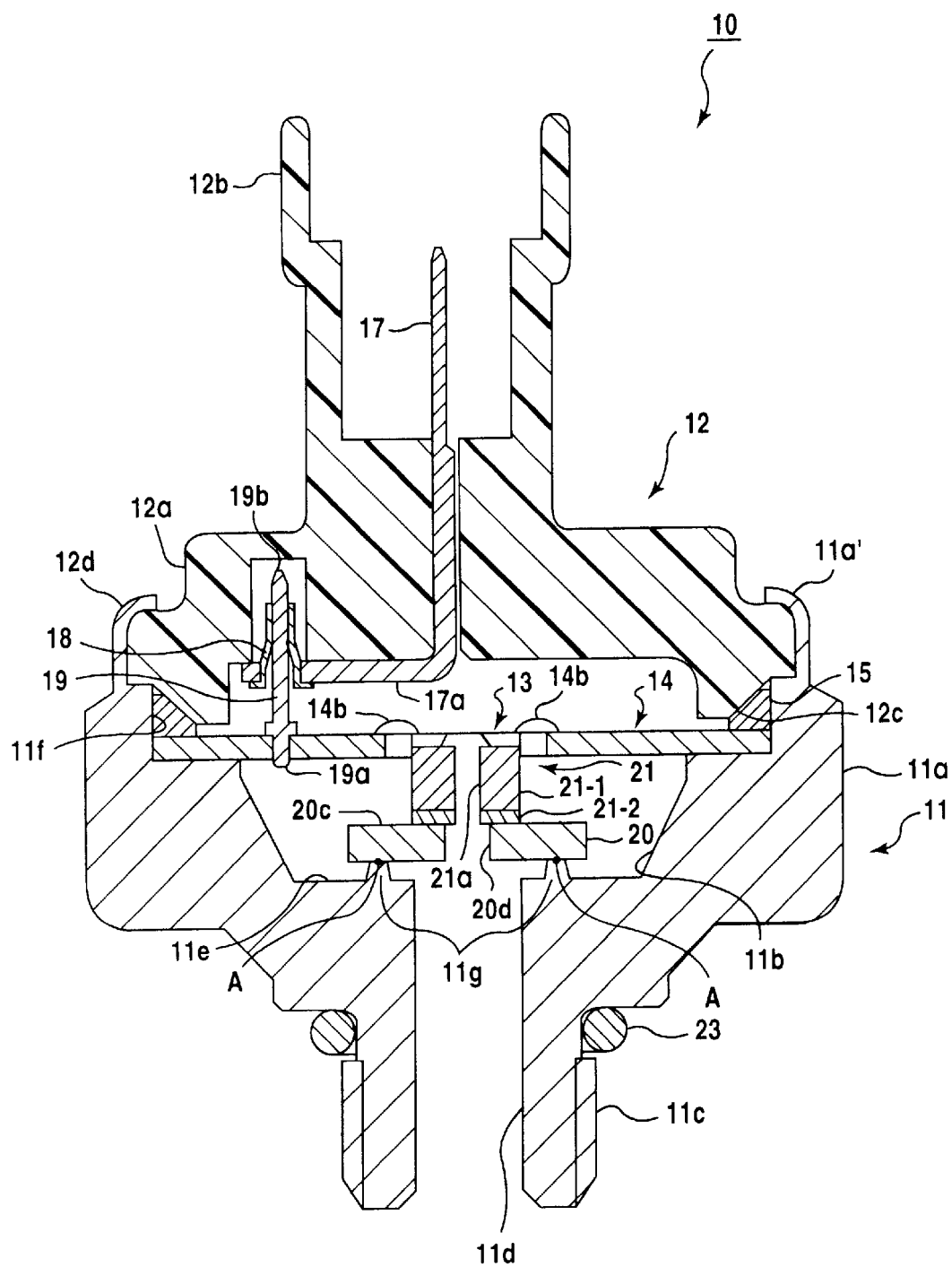
FIG. 1 is a vertical cross-sectional view showing the structure of the pressure sensor according to the present invention.

FIG. 1 is a cross-sectional view of the pressure sensor 10 according to the present embodiment. The pressure sensor 10 according to the present invention includes an exterior portion comprising a housing 11 made of metal material and an electric connector 12 connected to said housing 11, and in the inner area formed by the housing 11 and the electric connector 12 are positioned a semiconductor chip 13 forming on a semiconductor board a pressure sensing element comprising a piezoelement formed by placing a plurality of resistors in a bridge state, an amplifying circuit for amplifying the output of said pressure sensing device, a calculating circuit for calculating conversion of the output from said pressure sensing device, and so on, and an electric circuit board (print board) 14 mounting a predetermined outside circuit.

The housing 11 is formed of metal such as an iron (Fe) or a stainless steel (SUS), comprising a pipe-like screw 11c having a refrigerant liquid induction hole 11d on its lower portion, and a receiving open pipe 11a on its upper portion, and further comprising a funnel-like supporting portion 11b on its middle interior portion, and said funnel-like supporting portion 11b includes a flat bottom 11e on its lower portion.

Further, on the bottom 11e, a bank-like protrusion 11g having a predetermined height is formed in a circular or rectangular shape so as to surround the peripheral of the liquid induction hole 11d.

The electric connector 12 is formed by an electrically insulating material of artificial resin such as polybutylene terephthalate reinforced by glass, comprising a guide pipe 12b for the fitting and separating of a connector on the upper portion, and an enlarging fitting pipe 12a on the lower portion. In the interior of said electric connector 12, a plurality of connector terminals 17 penetrating the inner area of the enlarging fitting pipe 12a from the inner area of the guide pipe 12b are fixed.

The electric circuit board 14 is placed so as to fit into an inner ring portion 11f of said receiving open pipe 11a of the housing 11, and an o-ring 15 is positioned on said electric circuit board 14 for waterproofing and supporting of the board 14, which is fit into said ring portion 11f. The fitting pipe 12a of said electric connector 12 fits to the upper end of said receiving open pipe 11a of the housing 11, and in a state where a lower inclining portion 12c of said fitting pipe 12a of the electric connector 12 presses said electric circuit board 14 through said o-ring 15, an opening peripheral portion 11a' at the end of said receiving open pipe 11a of the housing 11 stakes a shoulder portion 12d of said enlarging fitting pipe 12a of the electric connector. By such method, the housing 11 and the electric connector 12 are fit and connected together, and the electric circuit board 14 is fixed and held firmly inside the inner area formed by the housing and the electric connector.

A connecting conducting sleeve 18 is connected and fixed to a lower angled end 17a of said connector terminal 17 by a spot welding and the like, and on said connecting conducting sleeve 18, an upper portion 19b of a pin terminal 19 is inserted, and a lower portion 19a of said pin terminal 19 is fixed onto an electrode pad not shown in the drawing formed on said electric circuit board 14 by soldering and the like. Said pin terminal 19 transmits electric signals from said electric circuit board to said connector terminal 17.

A stem 20 formed by an iron-nickel (Fe—Ni) alloy such as 42 alloy is formed as a circular flat plate having a predetermined thickness, with an upper mounting portion 20c for placing a seat 21, and a penetrating hole 20d in the center thereof working as a liquid path, with a gold (Au) plated layer having a thickness of approximately 1 μm formed on at least the surface opposing said seat 21.

Said stem 20 is welded and fixed airtightly by an electrical resistance weld (projection weld) A on a protrusion 11g mounted on the plan bottom portion 11e formed on the lower portion of the funnel-like supporting portion 11b in the inner area of the housing 11.

The seat 21 is welded and fixed aiitightly to the upper mounting portion 21 of the stem 20.

The seat 21 is formed as a glass-silicon seat by a pressure sensing element mounting member 21-1 made of glass and a stem connecting member 21-2 made of silicon (Si), and the glass mounting member 21-1 and the stem connecting member 21-2 are connected by an anode connection (FAB connection). Each of the above members are equipped with a penetrating hole 21a as is with the stem 20 for passing liquid through in the upper and lower direction which is concentric to the penetrating hole 20d of the stem 20, and said penetrating hole 21a is connected to a liquid induction hole 11d.

On the portion of the lower surface of the stem connecting member 21-2 of the seat 21 opposing the stem 20 is a gold (Au) plated layer having a thickness of approximately 1 μm formed by gold sputtering.

By positioning a gold-silicon (Au—Si) solder between the upper mounting portion 20c of the stem 20 and the lower surface of the stem connecting member 21-2 and heating the same, the two members are welded and fixed airtightly by a gold-silicon (Au—Si) connection forming an alloy of gold (Au) and silicon (Si).

A pressure sensing element 13 is mounted on the upper surface of the pressure detecting element mounting member 21-1 of the seat 21, which are welded airtightly together by an anode connection (FAB connection).

A diaphragm is formed on the pressure sensing element 13 which is a semiconductor chip by creating a thin portion on the center of the lower surface of the semiconductor board, and a strain gage is mounted on the upper surface of said diaphragm by forming a plurality of resistors in a bridge state as piezoresistor elements, wherein the pressure of the refrigerant introduced through the penetrating hole 20d of the stem 20 and the penetrating hole 21a of the seat 21 is impressed to the diaphragm, enabling output of electrical signals corresponding to the pressure of the refrigerant from the strain gage.

Further, in the pressure sensing element 13, electric circuits such as an amplifying circuit for amplifying the output from said strain gage or a calculating circuit is mounted by an integrated circuit manufacturing technique on the upper surface thereof in the thick portion other than the diaphragm portion which receives no influence of the pressure.

A predetermined outer electric circuit is mounted on the electric circuit board 14, and said board 14 and the semiconductor chip 13 is electrically connected by a bonding wire 14b. The electrical signal from the semiconductor chip 13 is transmitted to the electric circuit board 14 by said bonding wire, which is further outputted to a connector terminal 17 through a pin terminal 19.

A silicon dampproof agent could be coated as dampproof gel to the surface of the semiconductor chip 13 and the print board 14.

The housing 11 and the stem 20 is connected together by mounting the stem 20 to the protrusion 11g and performing an electric resistant weld, so the current concentrates to the protrusion 11g, enabling welding of the whole circumference of the upper surface of the protrusion 11g, and providing a welding with high quality.

Figure 2:
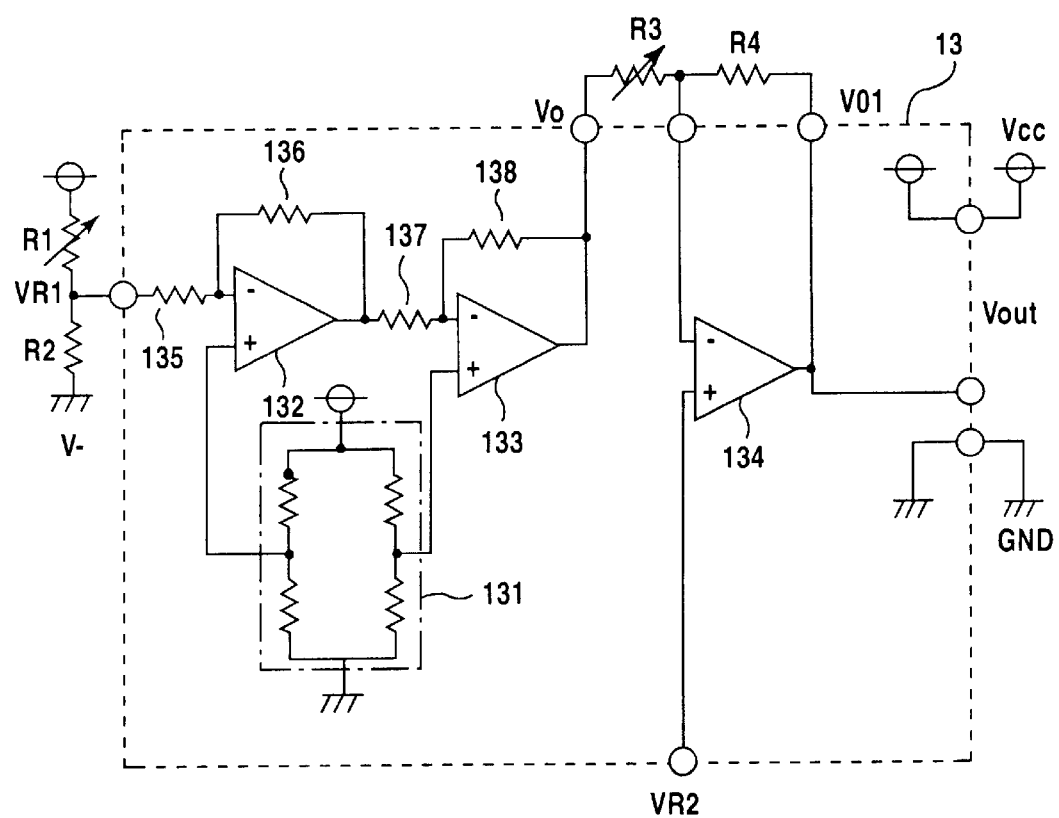
FIG. 2 is a circuit diagram showing the general circuit of the pressure sensing element of the pressure sensor according to the present invention.
Figure 3:
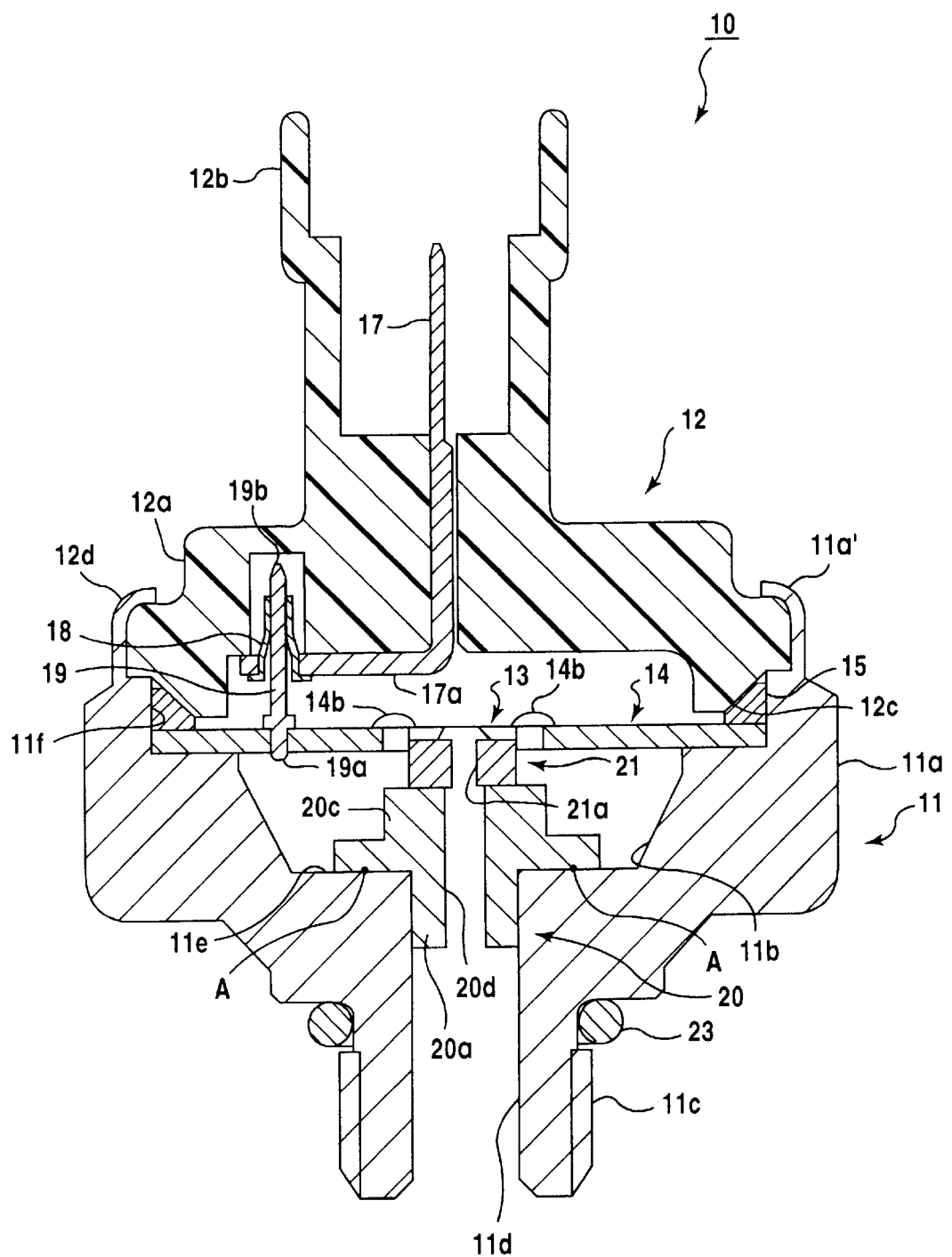
FIG. 3 is a vertical cross-sectional view showing the structure of the pressure sensor according to the prior art.

With reference to FIG. 2, the circuit structure of the semiconductor chip shown in FIG. 1 (the portion surrounded by the dotted lines of FIG. 2) is explained in general.

A strain gage 131 which is comprised of four bridge-connected piezoresistors is mounted on the upper surface of the diaphragm portion of the semiconductor board, and an amplifying circuit comprising calculating amplifiers 132, 133, 134 and resistors 135, 136, 137, 138 is mounted on the upper surface of the thick portion other than the diaphragm portion of the semiconductor substrate which receives no influence of the pressure.

Variable resistance $R_1$ and $R_2$ are voltage setting resistance for offset adjustment on the circuit, which enables adjustment of the offset on the circuit by adding a known pressure to the pressure sensing element, and performs a trimming to the resistance value of the variable resistance $R_1$ by use of a laser while watching its output. A variable resistance R3 is a gain adjusting resistance, which enables adjustment of the gain of the amplifying circuit by adding a known pressure to the pressure sensing element, and performs a trimming to the resistance value of the variable resistance $R_3$ by use of a laser while watching its output. A resistance R4 is a feedback resistance of the calculating amplifier 134. These resistance are mounted on the electric circuit board 14.

Further, Vcc indicates a power voltage, Vout indicates an output terminal, and GND indicates a ground terminal.

As was explained above, by mounting the sensing element and the amplifier on the same chip, the temperature of both electric circuits will vary in the same way, which enables easier temperature compensation and improved accuracy of the measurement. Further, by forming the pressure sensing element and the amplifying circuit on the same chip by an integrated circuit manufacturing technique, the pressure sensor could be miniaturized, and the manufacturing steps could be simplified.

Further, since the seat 21 is formed of a pressure sensing element mounting member 21-1 made of glass and a stem connecting member 21-2 made of silicon, a reliable electric insulation could be gained between the housing 11 and the pressure sensing element 13.

As was explained above, by the present invention, a pressure sensor with high reliability having a secure airtight connection between the seat for mounting the pressure sensing element and the stem and the housing, which enables easy assembly of each members of the pressure sensor could be gained.

We claim:

1. A pressure sensor comprising:
   a housing made of metal material, said housing defining an inner area of said pressure sensor;
   a semiconductor pressure sensing element positioned in said inner area of said housing for sensing pressure;
   a pressure sensing element mounting member having an opening; and
   a stem having an opening,
   wherein said housing comprises:
      a liquid induction portion having a liquid induction hole, said liquid induction hole having an opening to said inner area of said housing; and
      an annular protrusion formed on said housing surrounding a periphery of said opening of said liquid induction hole,
   wherein said pressure sensing element is fixed airtightly to said stem through said pressure sensing element mounting member,
   said stem is fixed airtightly to a top surface of said protrusion of said housing, and
   said opening of said pressure sensing element mounting member and said opening of said stem are connected to said liquid induction hole.

2. A pressure sensor comprising:
   a housing made of metal material, said housing defining an inner area of said pressure sensor;
   a pressure sensing element mounted on a semiconductor board positioned in said inner area of said housing for sensing pressure,
   a pressure sensing element mounting member having an opening;
   a stem connecting member having an opening; and
   a stem having an opening,
   wherein said housing comprises:
      a liquid induction portion having a liquid induction hole, said liquid induction hole having an opening in said inner area of said housing; and
      an annular protrusion formed on said housing surrounding a periphery of said opening of said liquid induction hole,
   wherein said pressure sensing element is fixed airtightly to pressure sensing element mounting member,
   said pressure sensing element mounting member and said stem are fixed airtightly through said stem connecting member,
   said stem is fixed airtightly on a top surface of said protrusion of the housing, and said opening of said pressure sensing element mounting member, said opening of said stem connecting member and said opening of said stem are connected to said liquid induction hole.

3. The pressure sensor of claim 2, wherein the fixing of said stem and said protrusion is performed by welding the stem and the protrusion by an electrical resistance weld.

4. The pressure sensor of claim 2, wherein the fixing of said pressure sensing element and said pressure sensing element mounting member, and the fixing of said pressure sensing element mounting member and said stem connecting member is performed by anode connection weld.

5. The pressure sensor disclosed in claims 1 or 2, wherein a gold plated layer is formed on at least a portion of the stem opposing said stem connecting member, and a gold plated layer is formed on at least a portion of the stem connecting member opposing the stem, and the welding of the stem and the stem connecting member is performed by a gold and silicon alloy formed by adding heat.

6. The pressure sensor disclosed in claims 1 or 2 wherein said pressure sensing element mounting member of said seat is formed of glass, said stem connecting member is formed of silicon or silicon alloy, and said stem is formed of 42 alloy.

7. The pressure sensor disclosed in claims 1 or 2 wherein said pressure sensing element comprises a thin diaphragm portion formed in the center area of the semiconductor board and a thick portion formed on the peripheral area thereof which is strong against deformation, and a pressure sensing portion having a plurality of resistors is mounted on said diaphragm portion in the center area, and a calculating portion formed by an integrated circuit manufacturing technique is mounted on said thick portion in the peripheral area.

8. The pressure sensor disclosed in claims 1 or 2 wherein said pressure sensing element comprises a thin diaphragm portion formed in the center area of the semiconductor board and a thick portion formed on the peripheral area thereof which is strong against deformation, and a pressure sensing portion having a piezoresistor is mounted on said diaphragm portion in the center area, and a calculating portion formed by an integrated circuit manufacturing technique is mounted on said thick portion in the peripheral area.

9. A pressure sensor comprising:

a housing having a fluid induction hole, said induction hole having an opening to an inner area of said housing, said housing further having an annular protrusion surrounding a periphery of said opening of said hole;

a semiconductor pressure sensing element for sensing pressure;

a mounting member for airtightly mounting said pressure sensing element; and a stem being airtightly fixed to said mounting member and to a top surface of said annular protrusion of said housing, wherein each of said mounting member and said stem defines a hole connected to said induction hole of said housing.

10. A pressure sensor comprising:

a housing defining an inner area and an outer area of said pressure sensor, said housing having a liquid induction portion having a liquid induction hole connecting said inner area and said outer area of said housing, said liquid induction hole having an opening to said inner area of said housing, a semiconductor pressure sensing element positioned in said inner area of said housing for sensing pressure, a mounting member for airtightly mounting said pressure sensing element; and a stem for airtightly mounting said mounting member, wherein
an annular protrusion is formed on said housing surrounding a periphery of said opening of said liquid induction hole,
said stem is airtightly fixed on a top surface of said protrusion, and
each of said mounting member and said stem has an opening defining a hole connected to said liquid induction hole.

11. A pressure sensor comprising:

a housing having a fluid induction hole, said induction hole having an opening to an inner area of said housing, said housing further having an annular protrusion surrounding a periphery of said opening of said hole;

a semiconductor pressure sensing element for sensing pressure; and a stem having an opening, said opening of said stem being connected to said opening of said induction hole, said stem being airtightly fixed on a top surface of said annular protrusion of said housing, and said semiconductor pressure sensing element being mounted on said stem.

* * * * *